United States Patent [19]

Beatty

[11] Patent Number: 5,154,993

[45] Date of Patent: Oct. 13, 1992

[54] ELECTRODE STRIPS FOR COILED ASSEMBLIES AND METHOD OF PRODUCING THEM

[75] Inventor: Theodore R. Beatty, Bay Village, Ohio

[73] Assignee: Eveready Battery Company, Inc., St. Louis, Mo.

[21] Appl. No.: 515,557

[22] Filed: Apr. 27, 1990

[51] Int. Cl.⁵ ............................................. H01M 2/26
[52] U.S. Cl. .................................... 429/211; 429/241; 29/2
[58] Field of Search ........................ 429/211, 161, 241; 29/623.4, 2

[56] References Cited

U.S. PATENT DOCUMENTS 3,083,249  3/1963  Belove ............................ 429/241 X
3,476,604  11/1969  Faber ............................... 429/241 X
3,513,034  5/1970  Fischbach et al. .................. 429/211
4,119,771  10/1978  Saridakis ........................ 429/211 X

FOREIGN PATENT DOCUMENTS 1279398  6/1972  United Kingdom .................... 429/4

Primary Examiner—Stephen Kalafut
Attorney, Agent, or Firm—Robert W. Welsh

[57] ABSTRACT

An electrode strip comprising a perforated conductive carrier, such as a nickel mat, coated with an electrochemically active material and wherein a selected area of the carrier free of the electrochemically active material is secured to a conductive tab on one side and a second conductive tab on the other side. The invention also relates to a method for producing the electrode strip.

20 Claims, 2 Drawing Sheets

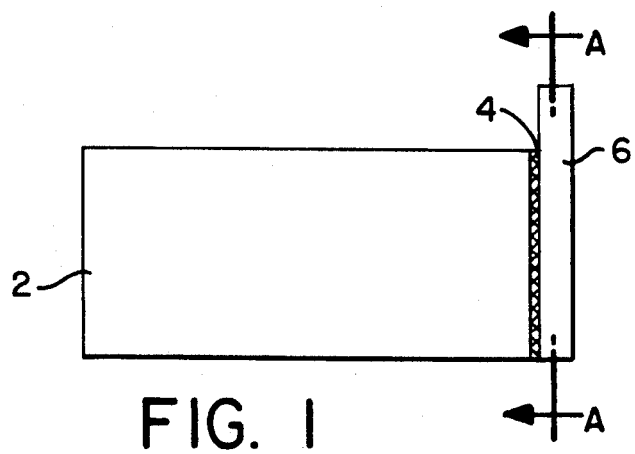 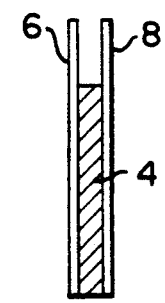
FIG. 1  FIG. 2
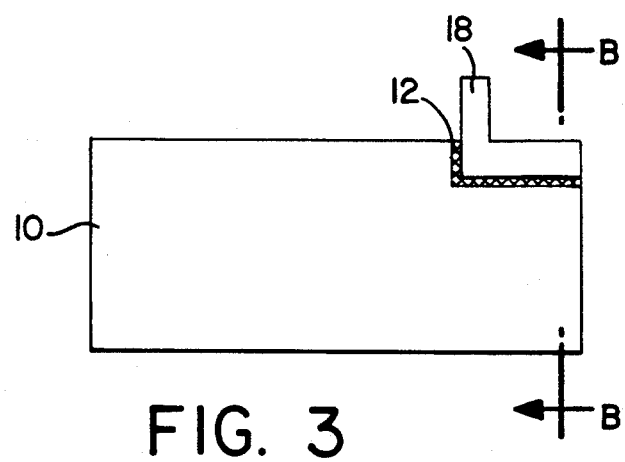 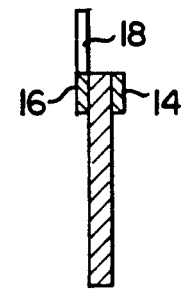
FIG. 3  FIG. 4
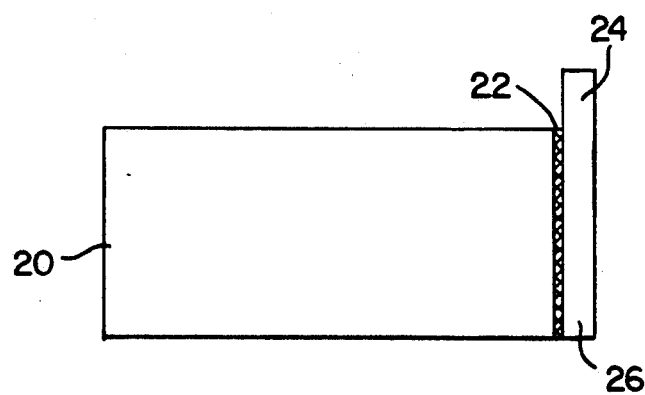 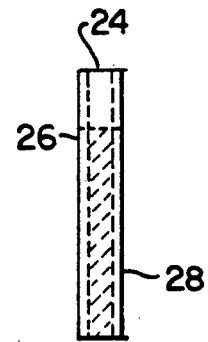
FIG. 5  FIG. 6

5,154,993

ELECTRODE STRIPS FOR COILED ASSEMBLIES AND METHOD OF PRODUCING THEM

FIELD OF THE INVENTION

The invention relates to an electrode strip having a clean selected area onto which a first conductive tab is superimposed over said selected area on one side of the electrode strip and a second conductive tab is superimposed over the opposite side of said selected area and said conductive tabs are secured together and to the selected area. The invention also relates to a method of producing the conductive tab connected electrode strip.

BACKGROUND OF THE INVENTION

Galvanic cells, preferably nickel-cadmium cells, employing rolled or coiled electrode assemblies (jelly roll construction) are widely known in the art. In many of these cell structures the coiled electrode assembly is inserted into a composite housing which serves as the current conductive terminals for the cell. In such structures, the electrode of one polarity is electrically connected with a conductive housing portion, and the electrode of the opposite polarity is electrically connected with another conductive housing portion which is insulated relative to the electrically conductive first-mentioned housing portion. The electric contact between each electrode and its respective housing portion is generally formed by an elongated flexible electrically conductive connecting tab or element which is secured at one end to the electrode and at the other end is secured to the respective housing portion. When this type of cell is being assembled, the tab is first secured to the electrodes by welding or other securing means whereupon the opposite end of the tab is electrically secured to an appropriate conductive area of the housing. For example, the opposite end of the tab connected to the outermost wound electrode could be bent back upon the outermost separator layer of the assembly so that when the coiled electrode assembly is inserted into the housing, the tab will contact the inner surface of the housing (can portion) with sufficient pressure to provide a satisfactory electrical contact.

Cells employing coiled electrode assemblies can be produced using various electrochemical systems such as Leclanche, nickel-cadmium, alkaline $MnO_2$, nickel-iron, nickel-zinc, nickel-hydrogen and the like. This invention however, can preferably be utilized in nickel-cadmium jelly roll cells. In the uncharged condition, the innermost electrode or positive electrode of a nickel-cadmium cell is nickelous hydroxide, the outermost electrode or negative electrode is cadmium hydroxide and the electrolyte is potassium hydroxide. In the charged condition, the positive electrode is nickelic hydroxide and the negative electrode is metallic cadmium.

The negative electrode of nickel-cadmium cells can be made by the rolling technique described in U.S. Pat. Nos. 3,310,437 and 3,432,351. As described in these patents, the carrier is usually a thin conductive strip such as a nickel strip or nickel clad (or plated) steel strip, lanced and stretched to give an open grid expanded metal. A mixture of electrochemically active material, binder, conductor and possibly other components are then coated on the carrier strip producing a negative electrode strip. The positive electrode may be made by the rolling technique as described in U.S. Pat Nos. 3,310,437 and 3,432,351 or may be impregnated nickel sinter as is well known and usually has an extended conductive tab, such as a thin nickel strip, welded to the longitudinal side of the electrode strip which when inserted in the can will be protruding through the open end of the can. The extended end of this conductive tab can then be suitably secured to the cover of the cell housing by conventional techniques such as welding or the like.

The negative electrode strip is generally the outermost wound electrode for nickel-cadmium cell systems and has a conductive tab secured to a selected area of the carrier at one end and to the cell housing at the opposite end. Conventionally, a conductive tab is welded to a selected area of the carrier by first removing the active electrode material about the area of the metal carrier to which the tab is to be attached. Generally, this removal process involves air blasting techniques. This removal process is followed by coining (pressing) the area of the carrier to be attached to the tab to reduce its thickness and flatten any burrs, and then the tab is spot welded to the selected area that has been coined. The electrode material could also be removed by scraping the material from the carrier or employing suction means to remove a portion of the electrode material from the selected area of the carrier. However, the employment of these methods to clean a selected area of the carrier has in some instances failed to remove all of the electrode material thus resulting in a poor welded connection to the conductive tab. Copending U.S. patent application Ser. No. 506,048 filed Apr. 9, 1990 discloses a method of cleaning a selected area of an electrode strip by using ultrasonic means provided by any suitable device, such as a prezo-electric oscillator, which can produce elastic waves of frequencies beyond the range of audibility generally in excess of 20,000 cycles per second. This application discloses that elastic waves of high frequency can be produced by quartz crystal oscillators designed for frequencies ranging up to 200 or 300 kilocycles per second. The disclosure made in this application is incorporated herein as if the entire disclosure were presented herein.

With the recent employment of conductive carriers made of fine diameter metal wire, such as nickel wire, to produce non-woven mat of low metal content (generally 5% to 10% by volume), a difficulty has been encountered in providing a good electronic securement of the carrier to a conductive tab. It has been observed that a conductive tab requires multiple welds to one side of the mat if a uniformly low resistance connection is to be made. In addition, the welding electrode that is placed against the mat generally becomes contaminated with small wire particles from the carrier during operation. When this occurs, the welding electrode has to be frequently cleaned or replaced resulting in inefficient production of the electrode strips.

It is an object of the present invention to provide an electrode strip with conductive tabs secured to both sides of a clean selected area of a perforated conductive carrier of the electrode strip.

It is another object of the present invention to provide an electrode strip made with a fine metal wire carrier and wherein a separate conductive tab is disposed onto each side of a selected area of the carrier and secured to the selected area of the carrier.

It is another object of the present invention to provide an electrode strip with an extended conductive tab that is cost efficient to produce when using a fine metal wire carrier.

It is another object of the present invention to provide a method for producing a good electrical connection between a conductive carrier of an electrode strip sandwiched between two conductive tabs so that said electrode strip would be suitable for use as an electrode of a coiled electrode assembly.

It is another object of the present invention to provide a method of electrically securing conductive tabs to a thin metal wire carrier of an electrode strip.

It is another object of the present invention to provide a method of cleaning a selected area of a perforated thin nickel wire carrier coated with an electrochemical active material and then welding a conductive tab onto each side of the cleaned selected area of the carrier.

Additional objects of the invention will become evident from the description and the drawings that follow.

SUMMARY OF THE INVENTION

The invention relates to an electrode strip suitable for use as an electrode in a coiled electrode assembly, said electrode strip comprising a perforated conductive carrier coated with an electrochemically active material and having a selected area of said carrier free of the coated electrochemically active material; a first conductive tab superimposed over and onto one side of said selected area; a second conductive tab superimposed over and onto the opposite side of said selected area; said first conductive tab and said second conductive tab secured together and to said selected area; and at least one of said conductive tabs extending beyond the edge of the electrode strip.

The invention also relates to a method for securing a conductive tab to an electrode strip that is suitable for use as an electrode in a coiled electrode assembly of an electrochemical cell comprising the steps:

a) preparing an electrode strip comprising a perforated conductive carrier coated with an electrochemical active material;

b) cleaning a selected area of the electrode strip to remove the electrochemical active material from the selected area of the electrode strip to expose the perforated conductive carrier;

c) superimposing a first conductive tab over and onto one side of selected area; and d) superimposing a second conductive tab over and onto the opposite side of said selected area with at least one of the conductive tabs extending beyond the edge of the electrode strip; and e) securing the first conductive tab to said selected area and said second conductive tab.

As used herein the term perforated carrier shall mean any carrier that is porous, has an open grid structure, woven structure or any other structure that will permit the flow of a medium such as air or liquid through the carrier.

The first and second conductive tabs could comprise one conductive sheet folded upon itself to produce a U-shaped cross-section into which the cleaned selected area of the carrier can be inserted. In this embodiment, the portion of the conductive sheet on one side of the carrier's selected area would be the first conductive tab and the portion of the conductive sheet on the opposite side of the carrier's selected area would be the second conductive tab. At least one of the conductive tabs has to extend beyond the edge of the electrode strip so that it can make electrical connection with an appropriate terminal of the cell in which it is assembled.

The invention is preferably for use in the production of electrode strips employing conductive carriers of fine metal wire made into a non-woven fiber mat of very low metal content. Generally the fine metal wire could be from 18 to 22 microns in diameter, preferably from about 20 microns in diameter. The fiber mat preferably has a metal content of from 4% to 6% by volume, most preferably about 5% by volume. By placing conductive tabs on both sides of the carrier, the tabs can be efficiently secured together and to the carrier on a continuous and uniform operation. This will effectively eliminate the contamination of wire particles on the electrode of the welding apparatus when such an apparatus is used as the securing means. In addition, the use of conductive tabs on both sides of the exposed conductive carrier will insure that uniformly low resistance connections can be produced on a continuous basis.

The dual conductive tab design of this invention can use conductive tab material of one-half the thickness of conventional tabs. Thus conductive tabs from 0.002 to 0.003 inch thick can be used in most applications, with a tab thickness of 0.003 inch being preferred. This double tab design will enable continuous welding to be employed in the production of electrode strips using conventional welders with single welds or multiple weld points that are made individually or at the same time.

Any suitable means can be employed to clean the selected area of the carrier such as by air blasting techniques, scraping the material from the carrier or using ultrasonic cleaning techniques as disclosed in the above-identified U.S. patent application Ser. No. 506,048, filed Apr. 9, 1990.

The method of securing the conductive tabs onto the selected cleaned area of the carrier could be done prior to assembling the conductive strip onto a coiled electrode assembly or after the electrode is assembled onto a coiled electrode assembly.

The preferred method of securing the conductive tabs to the conductive carrier is by conventional welding techniques such as spot welding. The cleaning of the selected coated area of the carrier of the electrochemically active material will remove the electrochemically active electrode material from the carrier thereby making the selected area of the carrier sufficiently clean to provide a good welding area for the conductive tabs. If the selected area of the coated carrier is not properly cleaned, the particles of the coating material will interfere with the welding of the conductive tabs by interfering with the flow of electrical current through the weld joints thereby inhibiting metal fusion between the carrier and the tab.

The location of the selected area of the carrier to be cleaned will depend upon the location or position that the electrode strip will be in when it is assembled in an electrochemical cell since the conductive tabs will have to be in a position to be electrically secured to a terminal of the cell housing such as the cell's cover or container. Thus the location of the area at which the conductive tab will electrically contact the cell housing will generally dictate where the tabs are to be welded to the electrode strip. In most applications, the selected area will be at the edge of the electrode strip and preferably at the end of the electrode strip. The selected area should be sufficient in size to accommodate the areas of the conductive tabs that are to be secured to the carrier.

Preferably, the selected area should be a little larger than the areas of the conductive tabs to be secured to the carrier to insure that a good, low resistance connection can be made without any active material or other foreign particles or dirt contaminating the securement of the tabs to the carrier. Although it is preferred to have the selected area a little larger than the area of the conductive tab, in some applications the selected area may only be large enough to receive the weld (weld area). Generally since the tab is welded to the carrier with a series of in-line welds, the area of the carrier that must be cleaned is relatively small and in some applications could be less than the area of the tab. As stated above, in some applications it is preferable to have the selected area at least a little larger than the area of the conductive tab so that the edges of the tab are positioned below the layer of active material and are thereby protected by the active material. In this embodiment, the tab could be effectively flush mounted with or below the surface of the active material. When the tab is positioned below the surface of the active material, the tab is less likely to cut through the separation disposed between the electrodes.

In conventional type coiled assemblies intended for "sub C" size cell housing, the selected area of the strip electrode to be cleaned may be between $\frac{1}{8}'$ and $\frac{3}{8}'$ wide and preferably $\frac{1}{4}'$ wide. The length of the area to be cleaned should be at least $\frac{1}{4}'$ and preferably the entire width of the electrode. In all applications, the selected area should be sufficient to provide a good electronic contact area with the conductive tab to ensure that an effective and efficient electronic path is provided from the carrier via the tab to the terminal of the cell housing.

The conductive carrier for the electrode strip could be made of nickel, nickel-plated steel, nickel foam or any other conductive material. Preferably the conductive carrier could be made of fine metal wire such as a nickel fibre mat available in the trade under the trade name of FIBREX manufactured by National Standard of Niles, Mich., U.S.A. The conductive carrier has to be perforated which shall mean having openings or pores into which the electrochemically active material can be deposited. The conductive carrier may also be a strip, such as a nickel strip that in lanced and stretched to provide an open grid expanded carrier or as stated above it could be a fibre mat having openings provided between fine diameter wires or strands. The conductive tabs could be a conductive metal or a non-conductive substrate coated with a conductive material. Preferably, the conductive tabs should be made of a metal such as nickel or nickel-plated steel with nickel being the most preferred.

In nickel-cadmium cell systems, the electrochemically active material to be deposited on the conductive carrier to form a negative electrode could be cadmium.

After the conductive tabs are secured to the electrode strip, preferably by spot welding, the following procedure may be used to produce a coiled electrode assembly cell:

1) superimposing a first electrode strip with the conductive tab over a second electrode strip of a different polarity with a first separator sheet between said electrode strips and a second separator sheet superimposed on one of said electrode strips;

2) rolling the electrode strips and separator sheets into a coil assembly so that the first electrode strip is electrically insulated from the second electrode strip by the separator sheets; and 3) inserting an electrolyte and the coiled assembly of step 2) into a cell housing and securing the conductive tab of the first electrode strip to a first terminal on the cell housing and securing the second electrode strip to a second terminal on the cell housing to provide a coiled electrode assembly cell.

If desired, the second electrode strip could also have conductive tabs secured to the carrier using the method of this invention.

The cell housing which includes at least a container and a cover may be made from materials such as nickel and nickel alloys, steel, nickel coated steel, tin coated steel and other conductive metals and metal alloys and the like. It is evident that in some applications the container and cover may be made of different materials.

The separator for use in this invention can be of any conventional type material such as non-woven polyamide fibers, polypropylene fibers, fibrous-reinforced regenerated cellulose or the like.

BRIEF DESCRIPTION OF THE DRAWINGS

FIG. 1 is a front view of an electrode strip that has a double conductive tab secured to a selected area of the electrode strip.

FIG. 2 is a side view of FIG. 1 taken along line A—A.

FIG. 3 is another view of an electrode strip that has a different type of conductive tab secured to a selected area of the electrode strip.

FIG. 4 is a side view of FIG. 3 taken along line B—B.

FIG. 5 is another view of an electrode strip that uses a bent conductive sheet to form the conductive tabs that are secured to a selected area of the electrode strip.

FIG. 6 is a side view of FIG. 5.

Referring to FIGS. 1 and 2, an electrode strip 2 is shown in which a selected carrier area 4 of the electrode strip 2 is shown between conductive tab 6 and conductive tab 8. The selected area 4 is shown along the widthwise edge of the electrode strip 2 and conductive tabs 6 and 8 are showing the same size with each extending beyond the edge of electrode strip 2.

FIGS. 3 and 4 show another electrode strip 10 in which a selected carrier area 12 is secured between conductive tab 14 and conductive tab 16. Only conductive tab 16 has a portion 18 extending beyond the edge of electrode strip 10 to make contact with a terminal member in a cell.

FIGS. 5 and 6 show an electrode strip 20 in which a selected area 22 is secured with a U-shaped conductive strip 24 composed of a first conductive tab 26 and a second conductive tab 28. Conductive strip 24 is bent to provide conductive tab 26 and conductive tab 28 which are dispersed on opposite sides of the selected area 22 of electrode strip 20.

In FIGS. 1 through 6, the conductive tabs are secured to the carrier's selected areas by any securing means such as welding, preferably spot welding. As shown, the selected areas are slightly larger than the area of the conductive tabs secured to said areas in order to insure that no electrochemically active material is disposed between the conductive tabs and the selected areas of the respective electrode strips.

Figure 7:
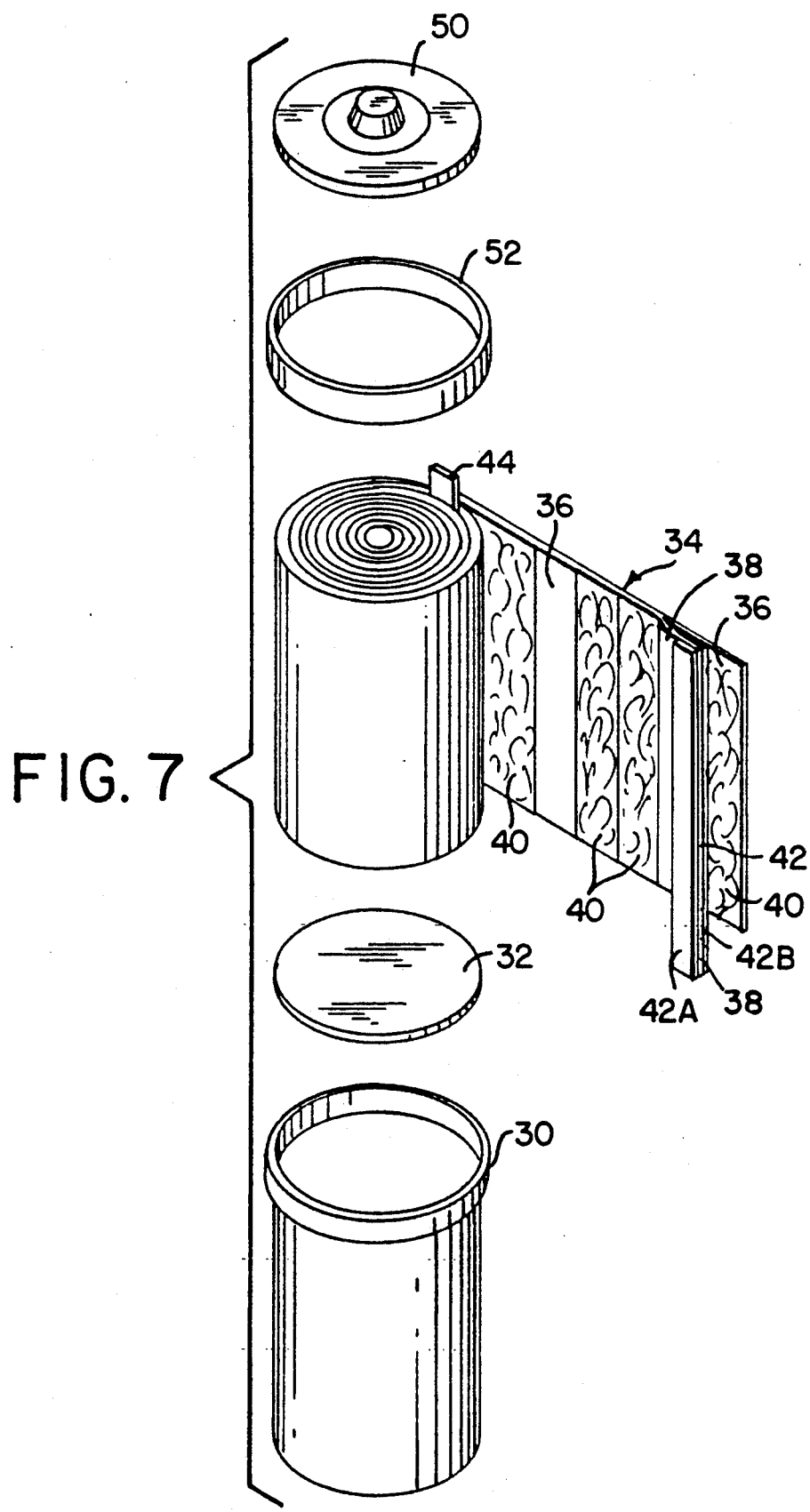
FIG. 7 is an exploded view of a galvanic cell employing at least one coiled flat electrode that has a double conductive tab design secured to a selected area on the electrode strip.

Referring in detail to FIG. 7, there is shown an exploded view of a cell employing a coiled electrode assembly. The cell comprises a cylindrical can 30 into which an insulating washer 32 is inserted to insulate the bottom of can 30. A coiled electrode assembly 34 is shown with an inner wound electrode 36, usually the positive electrode, an outer wound electrode 38, usually the negative electrode, and separators 40 which separate the electrodes. A double conductive sheet 42 composed of conductive tab 42A and conductive tab 42B is shown welded to negative electrode 38 while a conventional type conductive tab 44 is shown welded to the positive electrode 36. If desired, a double conductive tab design similar to 42 could be used as the conductive tab for positive electrode 36.

Double conductive sheet 42 can be bent back upon the outermost separator 40 prior to inserting the electrode assembly 34 into the can 30 so that when it is inserted, tabs 42A and 42B will provide a pressure contact against the inner wall of the can 30 thus adopting said can as the negative terminal. Tab 44 can be welded to cover 50 of the cell thereby adopting said cover 50 as the positive terminal of the cell. Cover gasket 52, made of any suitable insulating material such as nylon or the like, is interposed between the cover 50 and can 30 in a conventional manner to seal said can 30 while also insulating said can 30 from cover 50. In the assembled condition, tabs 42A and 42B provide the electronic contact between the negative electrode 38 and can 30. The electrode strips could be reversed so that the negative electrode could be connected to the cover, if desired. Electrode 36 could also have a selected area secured to a double conductive tab in accordance with this invention.

While the invention has been described in conjunction with the specific embodiments recited, it is obvious that certain modifications may be made to the invention without deviating from the scope of the invention.

What is claimed:

1. An electrode strip comprising a porous conductive carrier coated with an electrochemically active material and having a selected area of said carrier free of the coated electrochemically active material; a first conductive tab superimposed over and onto one side of said selected area of the carrier; a second conductive tab superimposed over and onto the opposite side of said selected area of the carrier; said first conductive tab and second conductive tab secured together and to said selected area of the carrier; and at least one of said conductive tabs extending beyond an edge of the electrode strip.

2. The electrode strip of claim 1 wherein both conductive tabs extend beyond an edge of the electrode strip.

3. The electrode strip of claim 1 wherein said first conductive tab and said second conductive tab are made from a single conductive sheet that is bent upon itself to provide two superimposed conductive tab portions and said selected area of the carrier is disposed between the bent sheet and secured to the conductive tab portions.

4. The electrode strip of claim 1 wherein the porous conductive carrier is made of metal wire.

5. The electrode strip of claim 4 wherein the diameter of the wire is from 18 microns to 22 microns.

6. The electrode strip of claim 5 wherein the porous conductive carrier has a metal content from 4 to 6 volume percent.

7. The electrode strip of claim 4 wherein the porous conductive carrier is made of wire selected from the group consisting of nickel and nickel-plated steel.

8. The electrode strip of claim 7 wherein the wire is nickel and is about 20 microns in diameter.

9. The electrode strip of claim 1 wherein at least one of the conductive tabs is made of a material selected from the group consisting of nickel and nickel-plated steel.

10. The electrode strip of claim 9 wherein the first conductive tab is made of the same material as the second conductive tab.

11. The electrode strip of claim 9 wherein the first conductive strip and second conductive strip are welded together and to the selected area of the carrier.

12. A method for securing a conductive tab to an electrode strip that is suitable for use as an electrode in a coiled electrode assembly of an electrochemical cell comprising the steps:

(a) preparing an electrode strip comprising a porous conductive carrier coated with an electrochemically active material;

b) cleaning a selected area of the electrode strip to remove the electrochemically active material from the selected area of the electrode strip to expose the porous conductive carrier;

c) superimposing a first conductive tab over and onto one side of said selected area of the carrier and superimposing a second conductive tab over and onto the opposite side of the selected area of the carrier with at least one of the conductive tabs extending beyond an edge of the electrode strip; and d) securing the first conductive tab and the second conductive tab together and to the selected area of the carrier.

13. The method of claim 12 wherein in step c) both conductive tabs extend beyond an edge of the electrode strip.

14. The method of claim 12 wherein in step a) a conductive sheet is bent upon itself to produce a first conductive tab portion and a second superimposed conductive tab portion and wherein the selected area of the carrier is positioned between the first conductive tab portion and the second conductive tab portion so that the first conductive tab is superimposed over and onto one side of the selected area of the carrier and the second conductive tab is superimposed over and onto the opposite side of the selected area of the carrier.

15. The method of claim 12 wherein in step d) welding means are used to secure the first conductive tab and the second conductive tab together and to the selected area of the carrier.

16. The method of claim 12 wherein the porous conductive carrier is made of metal wire.

17. The method of claim 16 wherein the wire is made of a material selected from the group consisting of nickel and nickel-plated steel.

18. The method of claim 12 wherein the diameter of the wire is from 18 microns to 22 microns.

19. The method of claim 16 wherein the porous carrier has a metal content from 4 to 6 volume percent.

20. The method of claim 16 wherein the carrier is made of nickel wire having a diameter from 18 microns to 22 microns and said carrier having a nickel content from 4 to 6 volume percent.

* * * * *